US007774744B2

(12) United States Patent
Moore et al.

(10) Patent No.: US 7,774,744 B2
(45) Date of Patent: Aug. 10, 2010

(54) USING RELATEDNESS INFORMATION FOR PROGRAMMING

(75) Inventors: Dennis B Moore, Hillsborough, CA (US); Joerg Beringer, Los Altos, CA (US); Horst Werner, Rettigheim (DE)

(73) Assignee: SAP AG, Walldorf (DE)

( * ) Notice: Subject to any disclaimer, the term of this patent is extended or adjusted under 35 U.S.C. 154(b) by 1141 days.

(21) Appl. No.: 11/412,255

(22) Filed: Apr. 26, 2006

(65) Prior Publication Data
US 2007/0265814 A1    Nov. 15, 2007

(51) Int. Cl.
*G06F 9/44* (2006.01)
(52) U.S. Cl. .................. 717/104; 717/101; 717/106; 717/107; 717/108; 717/116; 717/118; 707/706; 707/780; 707/803
(58) Field of Classification Search .................. 717/101, 717/106, 107, 104, 108, 111, 116, 118; 707/706, 707/755, 780, 803
See application file for complete search history.

(56) References Cited

U.S. PATENT DOCUMENTS

| | | | | | |
|---|---|---|---|---|---|
| 4,418,383 | A | * | 11/1983 | Doyle et al. | 710/307 |
| 4,833,594 | A | * | 5/1989 | Familetti et al. | 713/1 |
| 5,261,100 | A | | 11/1993 | Fujinami et al. | |
| 5,872,957 | A | * | 2/1999 | Worthington et al. | 703/13 |
| 5,872,958 | A | * | 2/1999 | Worthington et al. | 703/13 |
| 5,881,270 | A | * | 3/1999 | Worthington et al. | 703/21 |
| 5,983,016 | A | * | 11/1999 | Brodsky et al. | 717/104 |
| 6,018,627 | A | * | 1/2000 | Iyengar et al. | 717/103 |
| 6,269,473 | B1 | * | 7/2001 | Freed et al. | 717/104 |
| 7,086,009 | B2 | * | 8/2006 | Resnick et al. | 715/771 |
| 7,350,189 | B1 | * | 3/2008 | Bartlett | 717/104 |
| 7,386,832 | B2 | * | 6/2008 | Brunner et al. | 717/104 |
| 7,404,175 | B2 | * | 7/2008 | Lee et al. | 717/104 |
| 7,451,403 | B1 | * | 11/2008 | Srinivasan et al. | 715/763 |
| 7,565,640 | B2 | * | 7/2009 | Shukla et al. | 717/105 |
| 7,577,934 | B2 | * | 8/2009 | Anonsen et al. | 717/102 |
| 2003/0120678 | A1 | * | 6/2003 | Hill et al. | 707/102 |
| 2003/0121024 | A1 | * | 6/2003 | Hill et al. | 717/107 |
| 2005/0050537 | A1 | * | 3/2005 | Thompson et al. | 717/165 |
| 2006/0064670 | A1 | * | 3/2006 | Linebarger et al. | 717/106 |
| 2009/0125128 | A1 | * | 5/2009 | Eldridge et al. | 700/86 |
| 2009/0125129 | A1 | * | 5/2009 | Eldridge et al. | 700/86 |

FOREIGN PATENT DOCUMENTS

EP    1030242    8/2000

OTHER PUBLICATIONS

Title: WREN— an environment for component-based development, author: Chris Lueer et al, source: ACM, publication date: Sep. 2001.*
Title: Model-driven design and deployment of service-enabled web applications, author: Ioana Manolescu et al, source: ACM, publication date: Aug. 2005.*
EP Publication No. 1 860 549 A1 published Nov. 28, 2007 (EP Application No. 07007432.3-1243 filed Apr. 11, 2007) Extended EP Search Report dated Oct. 24, 2007.
Kim, et al., "APAS: The ADA Programming Assistant System", Proceedings of the Int'l Conf. on computer Languages, Miami Beach, Oct. 9-13, 1988, Washington, IEEE Comp. Soc. Press, US, Oct. 9, 1988, pp. 379-386, XP00013977.

* cited by examiner

*Primary Examiner*—Chameli C Das
(74) *Attorney, Agent, or Firm*—Blakely Sokoloff Taylor & Zafman, LLP

(57) ABSTRACT

Methods and apparatuses enable evolution of components used in developing modeled applications and processes. A framework allows for observing and storing information regarding the relatedness of a component to another component. The framework can provide context changes and component modifications based at least in part on the observed relatedness information for use in development and/or execution of developed applications and processes.

23 Claims, 9 Drawing Sheets

USING RELATEDNESS INFORMATION FOR PROGRAMMING

FIELD

Embodiments of the invention relate to modeled software applications, and more specifically to a changing the behavior of modeled software components according to observed behavior of the components.

BACKGROUND

Traditional development of software involves the direct coding of a program or a business process. Traditional coding resulted in a great deal of custom development of basic components used in a program or business process, including business objects. Even when modeling software through a modeling framework, many components of system development were designed for a specific application, without looking to reuse of the components. An enterprise could end up with a large amount of similar basic components, and non-standardized applications and processes. The accumulation of such components is a result of duplicated programming effort, which represents inefficiencies in the development of systems.

Besides the duplication of effort, traditional systems require a user to choose from a very large amount of potential components and systems. Traditional systems were incapable of encouraging design that was focused on standardization and component reuse.

SUMMARY

Methods and apparatuses enable evolution of components used in developing modeled applications and processes. A framework allows for observing and storing information regarding the relatedness of a component to another component. The framework can provide context changes and component modifications based at least in part on the observed relatedness information for use in development and/or execution of developed applications and processes.

BRIEF DESCRIPTION OF THE DRAWINGS

The following description includes discussion of various figures having illustrations given by way of example of implementations of embodiments of the invention. The drawings should be understood by way of example, and not by way of limitation.

DETAILED DESCRIPTION

Figure 1:
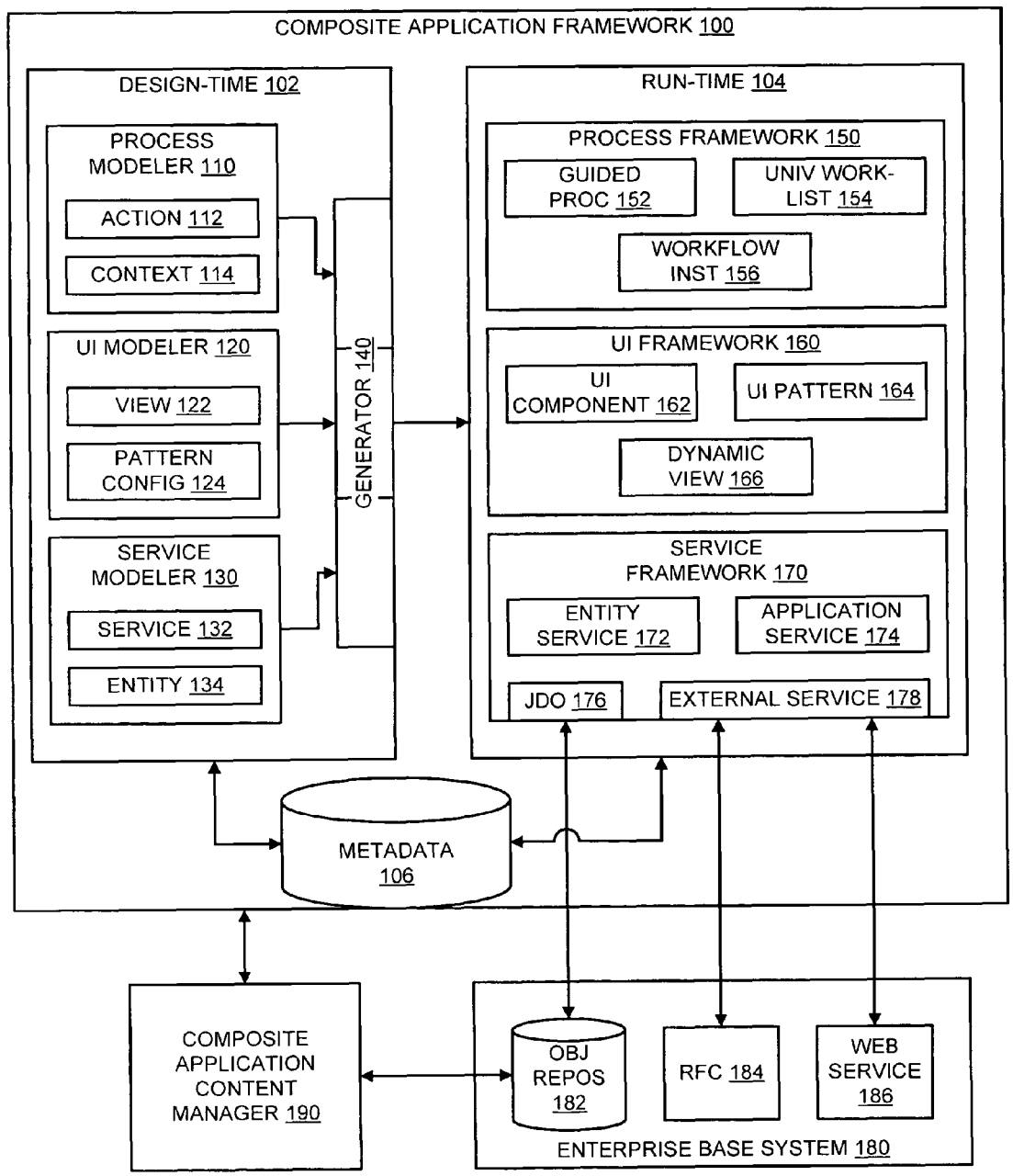
FIG. 1 is a block diagram of an embodiment of an application framework with run-time and design-time components.

As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive. Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

Various building block components can be used in programming applications and creating and modeling business processes. Components can be adapted to increase the likelihood of reuse of the components, and increase the usefulness of the components. The components can be adapted based on relatedness information observed/gathered for the components.

Traditional software applications were generally directly coded. Applications can be modeled instead of coded, by creating a metadata description within the context of a framework, describing what the application is supposed to do. The metadata describes how to interact with certain building block components (e.g., data objects, processes, actions, templates/patterns), and may define a relationship between different components. The components may be data objects, or components that describe action on/with data objects. The components themselves include data and a definition or rules regarding the behavior of the component. Behavior of the component refers to relationships of the component with other components, how to call, use, or otherwise interact with the data, or any other description of what is done with the data.

While reference is made to applications, business processes can also be modeled by creating a metadata description within the context of the framework what the business process is supposed to do. For both applications and business processes, the framework can generate the code based on the model description. Additionally, the framework may be cross-functional and have access to multiple disparate back-end systems. Thus, objects and functionality and services can be accessed across many different systems (e.g., human resources (HR), finance, customer relation management (CRM), etc.). Description is made herein with reference to applications, which may refer to software programs, and should be understood to apply equally to business processes, which refer to a sequence of actions/activities.

The building block components are the components from which the metadata model is derived. The building block components can be provided in one or multiple building block component repositories or galleries. The repository of components is accessed during the process of modeling. By allowing the components to be adapted based on common behavior or usage of the components, the repository of components is more likely to have components that will promote reuse. The reuse of objects is likely to result in greater standardization of applications across an enterprise.

When building software, developers may compare objects and consult semantic research to determine whether or not certain objects appear with other objects, or are used in particular actions or processes. The use may be quantified as a frequency of use of a particular object with another object or action. For example, a particular phone number may be related to a specific address, resulting in a highly related relationship between the two items. If the objects are always related, they may be combined as a single object. A third item that may be used frequently with the other two objects may or may not be combined in a single object with the other two. However, it may be always part of a particular action on the single object, and so would be related to the action.

The relatedness information may be implicit, wherein relatedness is inferred based on the model and relationships in the data, heuristics, and values. Relatedness may be explicit, for example, as indicated by a user. Relatedness may thus be determined by an agent scouring databases and determining the relatedness based on heuristic functions, and/or may be provided directly by a user.

In developing software under the framework described herein, relatedness information can be incorporated to describe the new application to be developed. Relatedness can also be used in the execution of an application, for example, through guided data entry, contextual views, and/or other mechanisms. For example, when using an application that incorporates relatedness information to develop a new project, certain information about budget, department, topic, etc., may be known. Some or all of the known information may have relatedness information indicating, for example, a project leader or team member who has relevant experience, etc. Additionally, relatedness information may be gathered that indicates that a particular user always looks at one record in conjunction with looking at another record. This information could provide the ability to adapt to the context of the user. Relatedness information may be stored as metadata related to the data to which the relatedness information applies.

The relatedness information can provide a predictive capacity for use in developing and/or using a developed application. In developing an application, a predictive mechanism can determine based on the selected processes and services, and potentially the order of the components selected, that statistical probability indicates a certain other service is generally selected. The development interface can recognize that certain services are generally selected together, and present adding the services together in a single function, rather than selecting each separately. Additionally, a particular process pattern can be recognized (e.g., a hiring business process). If a pattern is recognized by a relatedness agent, which may be referred to as a content manager, the content manager may suggest the use of a pattern available in the repository.

Relatedness information is generated through observation of the behavior of objects in modeling or during execution of an application or process. The content manager can gather information and store it in a relatedness information metadata repository. In one embodiment, relatedness information is stored as metadata associated with a particular object, process, etc. The metadata can be passed or accessed when the object is called, which can give context for programming or application execution.

In addition to providing context, the relatedness data can provide legal benefits, and benefits of reuse. Processes can be used that are known to comply with legal compliance issues (e.g., the Sarbanes-Oxley Act). Processes can be suggested, or components suggested that provide legal compliance. Reuse benefits come from enabling users to develop systems that would otherwise be too expensive in terms of time and knowledge to generate. Additionally, the reuse can apply to obtaining processes from any source, for example, from different departments, different companies, etc., and placing them in a single repository. The reuse can reduce the likelihood of duplicate or very similar components by allowing components to be adapted over time.

FIG. 1 is a block diagram of an embodiment of an application framework with run-time and design-time components. In general, framework 100 leverages and enhances underlying enterprise base system 180, which could include one or more elements of data and/or functionality to perform operations. Framework 100 provides a structure with which to generate composite applications, which are modeled/generated software. Composite applications may support semi-structured processes, handle event-driven and knowledge-based business scenarios, and/or support collaboration. In one embodiment, composite applications support the JAVA stack. The composite applications may be broken down into various portions, each of which may be separately generated/modeled. The composite application portions may, in one implementation, be implemented as ENTERPRISE JAVA BEANS (EJBs), and in other implementations, the design-time components may have the ability to generate the run-time implementation into different platforms, such as J2EE, ABAP, or .NET. In one embodiment, the framework 100 is the composite application framework (CAF) available from SAP AG of Walldorf, Germany.

Framework 100 generally allows composite applications to work within existing system environment by decoupling the applications from the underlying enterprise platform. Decoupling the applications from the underlying enterprise platforms may include providing communication to back-end systems via a central interface and providing a back-end-independent object model. Framework 100 includes design-time components 102 and run-time components 104. Design-time components 102 include modeling components with which to generate a composite application, and one or more mechanisms to generate the model. In general, design-time components 102 are responsible for developing composite applications that are executed by run-time components 104.

Design-time components 102 include process modeler 110, UI modeler 120, and service modeler 130. These modelers are not necessarily separate entities, although they may be. Furthermore, additional modeling tools may be provided within design-time components 102. In general, the modelers allow for integrating business objects, business services, business processes, user interfaces, etc. Process modeler 110 includes the capability of generating one or more actions 112, which represent the various phases of a process. Each action 112 has an associated operation or operations that represent the work of action 112. Action 112 may be part of an activity that is generated, or part of a guided procedure that provides interaction with the user on performing operations. In an embodiment where action 112 is part of a guided procedure, process modeler 110 includes information with each action 112 to execute the guided procedure.

Process modeler 110 also includes context 114, which provides awareness to the process regarding the enterprise system in which it is operating. Where a function is used from an application that does not understand the enterprise system, process modeler 110 can wrap the function in metadata to incorporate the function into the system.

User Interface (UI) modeler 120 provides the ability to generate a user interface and provide views of data/processes that can be accessed through a composite application generated with framework 100. UI modeler 120 can generate any of a number of views 122 on data. In one embodiment, standard views or patterns are used for each application developed. A user interface may include certain elements from a template.

Thus, user interfaces may have certain common components and provide a familiar look and feel across multiple applications. Certain views are dependent upon the environment in which the application is executed. Views 122 may include capability to dynamically generate views based on roles, authorizations, and activities associated with the application. Pattern configuration 124 of UI modeler 120 allows the use of templates and standard UI components.

Service modeler 130 enables a composite application to access data. Data objects are accessed via services. Thus, service modeler 130 provides the service-oriented model through which data is accessed. In one embodiment, service modeler 130 provides an enterprise service architecture (ESA), where applications are developed through a service-driven, rather than a model-driven, architecture. A service-driven architecture provides access to callable services that provide interaction with data. Service modeler 130 includes service 132, which represents one or more service that may be provided. Service 132 may include, but is not limited to, guided procedures, object monitoring, standalone actions, programs or functions, etc. Entity 134 of service modeler 130 provides a component generated to access a service within the enterprise, or a web service. An enterprise or web service as described here refer to entities within a network (either within a network of the enterprise, or within the Internet) that are addressable and provide a capability based on a request and/or input parameters (e.g., flight booking).

Generator 140 represents one or more components to transform the model into run-time components. In one embodiment, generator 140 is a single component, while in alternate embodiments, generator 140 is multiple components.

Run-time components 104 provide instantiation of the items modeled with run-time components 102, and include various frameworks within which object or service instances operate. Process framework 150 represents a framework under which one or more instances of processes can execute. For example, process framework 150 may include guided procedure 152, universal worklist 154, and/or workflow instance 156. Guided procedure 152 represents an instance of a guided procedure as discussed previously. Universal worklist 154 provides a list of all workflow or process items available to a user. A workflow or process may be available to a user through an operation requested of the user on the workflow/process, and/or through the user having a responsibility authorization with respect to the workflow/process. Universal worklist 154 may be used to access work centers for each process available. Workflow instance 156 provides an example of one or more workflows that represent work requested of a user. The workflow may have one or more actions for the user to perform.

UI framework 160 provides abilities to render views on data and processes. In one embodiment, UI framework 160 includes a view manager (not shown) that provides dynamic management of content that will be displayed/presented to a user. UI framework 160 may include UI component 162, which represents one or more elements of a user display. In one embodiment, UI component 162 includes elements for rendering the display in a web browser, although another environment could be used. In one embodiment, a separate application viewer could be used. UI pattern 164 provides patterns and standard elements for rendering the user interface. UI pattern 164 may provide UI component 162. UI pattern 164 may be a template with various components 162 to provide buttons, links, text, etc., that may be standard to every application generated, or partially customized with instance-specific data.

In one embodiment, UI framework 160 includes dynamic view 166. Dynamic view 166 represents a view that has one or more dynamic components, and may change the content of the application that provided to a user. Dynamic view 166 changes content based on an authorization of a user. The content can be changed dynamically to reflect personnel structuring changes (e.g., moves, promotions, terminations), and change of the underlying data or service content.

Service framework 170 implements the data access through services available to the user. A user may have access to one or more entity services 172, application services 174, JAVA data object (JDO) services 176, and/or external services 178. Application service 174 represents services local to the composite application, or directly accessible by the application. JDO 176 can access object repository 182 of enterprise base system 180. Similarly, enterprise base system 180 may include remote functions that are accessed through one or more remote function calls (RFCs) 184, and one or more web services 186. External service 178 accesses elements remote elements (for example, RFC 184 and web service 186).

Metadata 106 represents an abstraction of one or more data and/or access/service resources that may be accessed and utilized by design-time components 102 and run-time components 104. Metadata 106 is not necessarily a resource within one of the components, nor is it to be understood as being only available to the components. Metadata 106 provides a repository that includes metadata about business objects, business services, business processes, and/or other application portions for use in modeling and/or executing the application portions. Thus, an application portion may be modeled, as well as the origin of the data, whether in a local database, remote database, or a combination of the two. In one embodiment, the content of metadata 106 includes information extending beyond a specific implementation of an application portion. There could be repositories that describe a specific implementation, which may be filled from a more general repository. Metadata 106 can be understood as including a general, a specific, or a combination of repository information.

Composite application content manager 190 represents a module or agent that manages, creates, and/or uses related-ness data through framework 100. Composite application content manager 190 may provide contextual information and allow for evolution of component elements used in developing applications with framework 100. Run-time components 104 generate instances of modeled elements, which may be monitored by composite application content manager 190. Composite application content manager 190 may access data in object repository and/or write information to the repository. Repository 182 includes component elements that can be used to develop software with framework 100.

Figure 2:
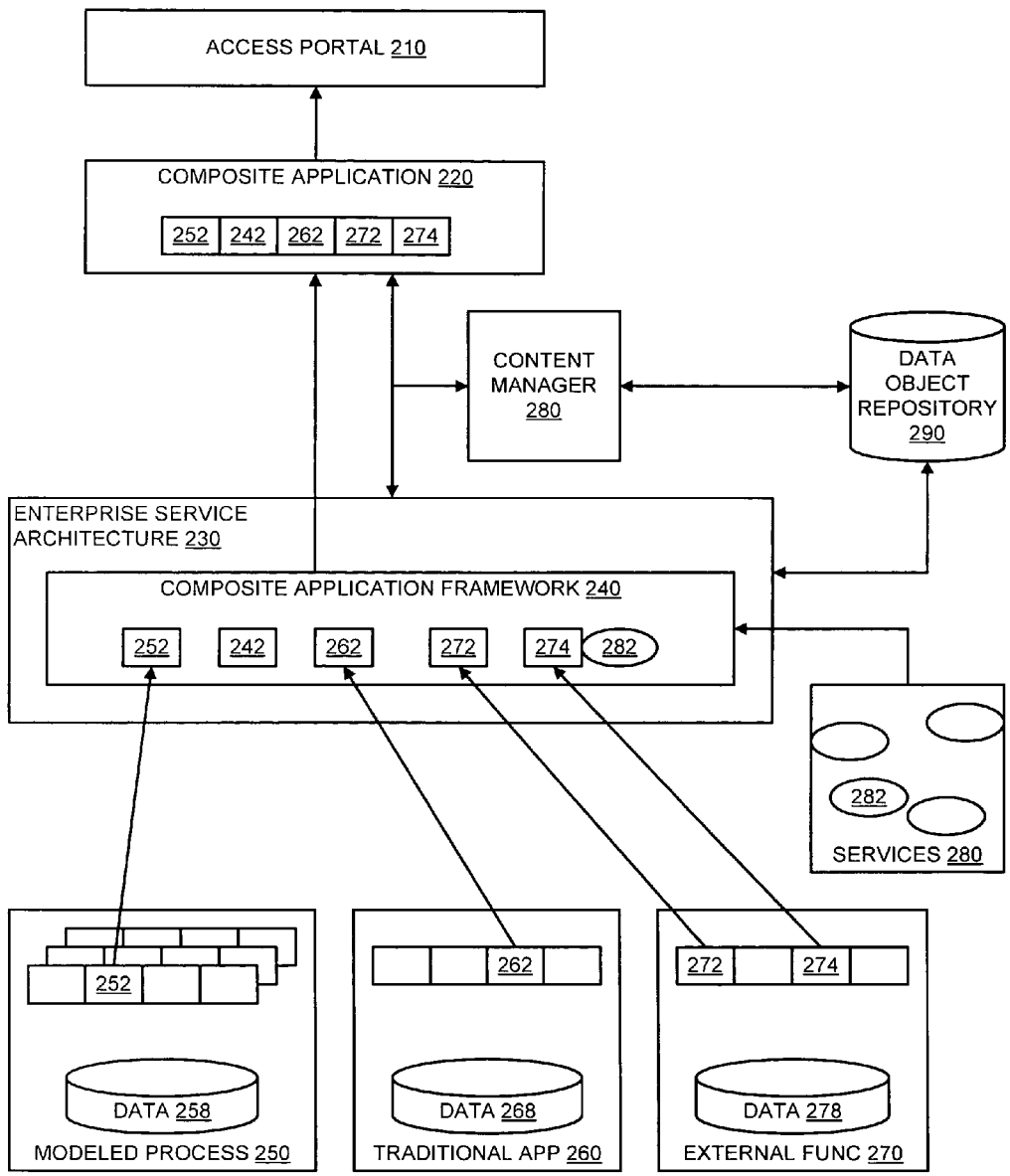
FIG. 2 is a block diagram of an embodiment of an enterprise service architecture.

FIG. 2 is a block diagram of an embodiment of an enterprise service architecture. The enterprise service architecture provides an architecture through which to provide dynamic content views and access through access portal 210. Access portal 210 may be any type of network portal through which an enterprise may be accessed.

The system of FIG. 2 may include multiple types of sources for functionality that are combined as a composite application. For purposes of example, and not by way of limitation, a composite application will be considered that includes components from several functionality sources. The use of different sources of functionality should not be understood as a requirement to the development of a dynamic data view as described herein. Examples of potential sources of functionality include modeled process 250, traditional application 260, and external functionality 270.

Modeled process 250 includes one or more processes that are generated from modeled components, for example, according to a framework as described in FIG. 1. Modeled process 250 includes data 258, which represents data related to the processes of modeled process 250. One element of a process is phase 252, which may include certain actions or activities or guided procedures.

Traditional application 260 includes one or more processes generated from a more traditional application. In this case, a more traditional application is one that is not modeled, in contrast to modeled process 260. Rather than being modeled and generated, traditional application 260 may include proprietary functionality, or services and data not based on a standard components available across sub-systems. Traditional application 260 includes data 268, which represents data related to the process of traditional application 260. One element of the process is phase 262, which may include functionality desired for a dynamic composite view. Traditional application 260 and modeled process 250 may understand the underlying framework and system in which the composite view will be instantiated. Thus, phases 252 and 262 may be contextually aware.

External function 270 includes one or more processes available outside the environment of the enterprise system. For example, external function 270 may represent a function available from a program that is a third-party as to the enterprise system. External function 270 may be a remote function that is accessed and executed. Phases 272 and 274 represent phases of a process of external function 270 that are desired for a composite application. Metadata may be included when bringing in components from external function 270, which can serve as a wrapper to incorporate the external functionality.

Services 280 represent one or more services that can provide a service to a composite process. Services 280 include service 282, which provides a service to be incorporated into the composite process of a composite application.

The selected process phases and service(s) are pulled in to enterprise service architecture 230 through composite application framework 240. Composite application framework 240 is a framework according to an embodiment of Framework 100 of FIG. 1. A process phase may also be generated within the framework that is not pulled from existing processes. For example, composite application framework may model phase 242 as an element of the composite application process. Each of the phases and services selected for a composite application are combined to generate composite application 220, which includes composite process 222 generated of the various selected elements. Namely, phases 252, 242, 262, 272, and 274 are combined to form composite process 222 that is accessible to a user through access portal 210.

In one embodiment, the system of FIG. 2 includes data object repository 292 and content manager 294. Data object repository 292 provides one or more repositories or galleries of component objects that can be used to generate composite application 220. Services 280 are available to access data objects of data object repository 292. Content manager 294 can also access data object repository 292 to access objects, metadata about objects, and store metadata. Content manager 294 may determine the behavior of objects based on the development and/or execution of the composite process of composite application 220. Content manager 294 can guide the development of the composite process and/or guide the execution of the process.

Figure 3:
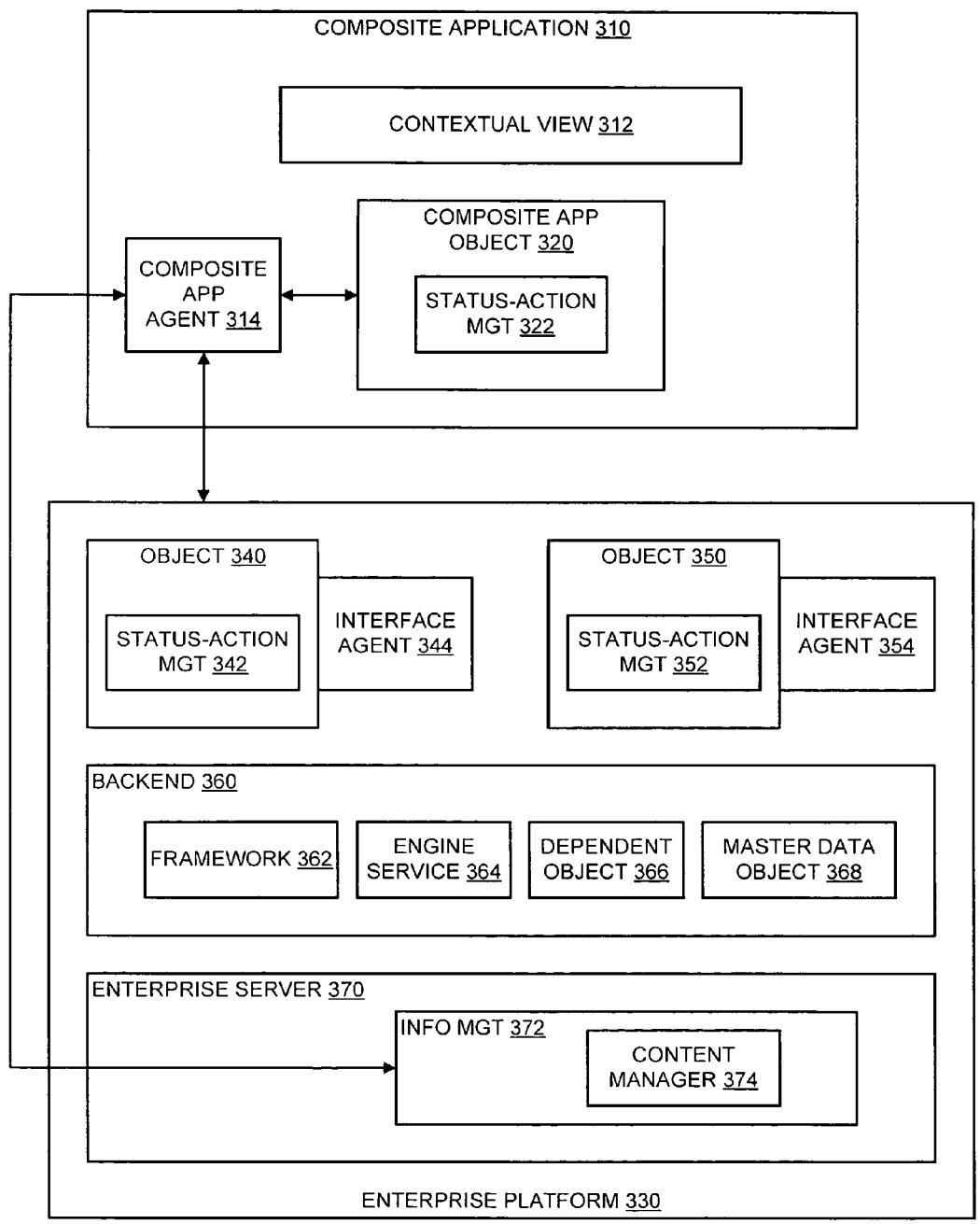
FIG. 3 is a block diagram of an embodiment of a composite application architecture.

FIG. 3 is a block diagram of an embodiment of a composite application architecture. Composite application 310 is an example of a composite application or a composite view according to any embodiment described herein. Composite application 310 is generated with a service-oriented architecture to provide access to cross-functional components of backend systems. Composite application 310 includes contextual view 312, which represents a dynamic view that varies content as the underlying accessed system components change, and varies content in response to different permissions being used to access the composite application. Contextual view 312 includes roles and work centers, composite application-specific user interfaces, etc. With regard to the dynamic views, in response to being invoked by a user with a particular authorization, contextual view 312 may display certain content. In response to being invoked by a different user with a different authorization, or by the same user with a different authorization, different content may be displayed, or different access possible.

Composite application 310 includes composite application (app) object 320, which represents an object related to composite application 310. Composite application object 320 includes status/action management (mgt) 322, which can be used to track composite application object 320. Status/action management 322 may manage the behavior of the object and provide consistency between the instance of composite application object 320 and enterprise platform 330. Status/action management 322 can also be used to gather statistics about the behavior of composite application object 320 (i.e., relatedness data). In one embodiment, status/action management 322 influences contextual view 312. Composite application object 320 has an associated composite application agent 314, which provides input and output to/from object 320. In one embodiment, composite application agent 314 is multiple agent entities, and may be an input agent and an output agent. Additionally, composite application agent 314 may provide queries or requests to/from composite application object 320. In one embodiment, each object of composite application 310 has a separate agent or agents. In another embodiment, composite application agent 314 is associated with composite application 310, and provides services for multiple object instances within composite application 310. Composite application agent 314 can provide relatedness data to information management 372, described below.

Enterprise platform 330 may have multiple objects 340 and 350, each of which may have an interface agent, specifically, interface agents 344 and 354, respectively. Through the agents, objects 340 and 350 may access or be accessed by other components of enterprise platform 330. Objects 340 and 350 also include status/action management 342 and 352, respectively. Objects 340 and 350 represent objects from which specific instances may be generated in composite application 310.

Enterprise platform 330 includes backend 360, which provides backend components for the enterprise. Backend 360 may include framework 362, which may be a composite application framework as described herein to provide a framework with which to generate composite application 310. Engine service 364 provides backend services that are leveraged to generate composite application 310. Dependent object 366 and master data object 368 represent object types available in backend 360.

Enterprise platform 330 also includes enterprise server 370 with information management 372, which provides management functions, including analytics, search, tasks, master data, etc. In one embodiment, information management 372 includes content manager 374, which is a content manager according to any embodiment described herein. Information management 372 can gather and provide relatedness information.

Figure 4:
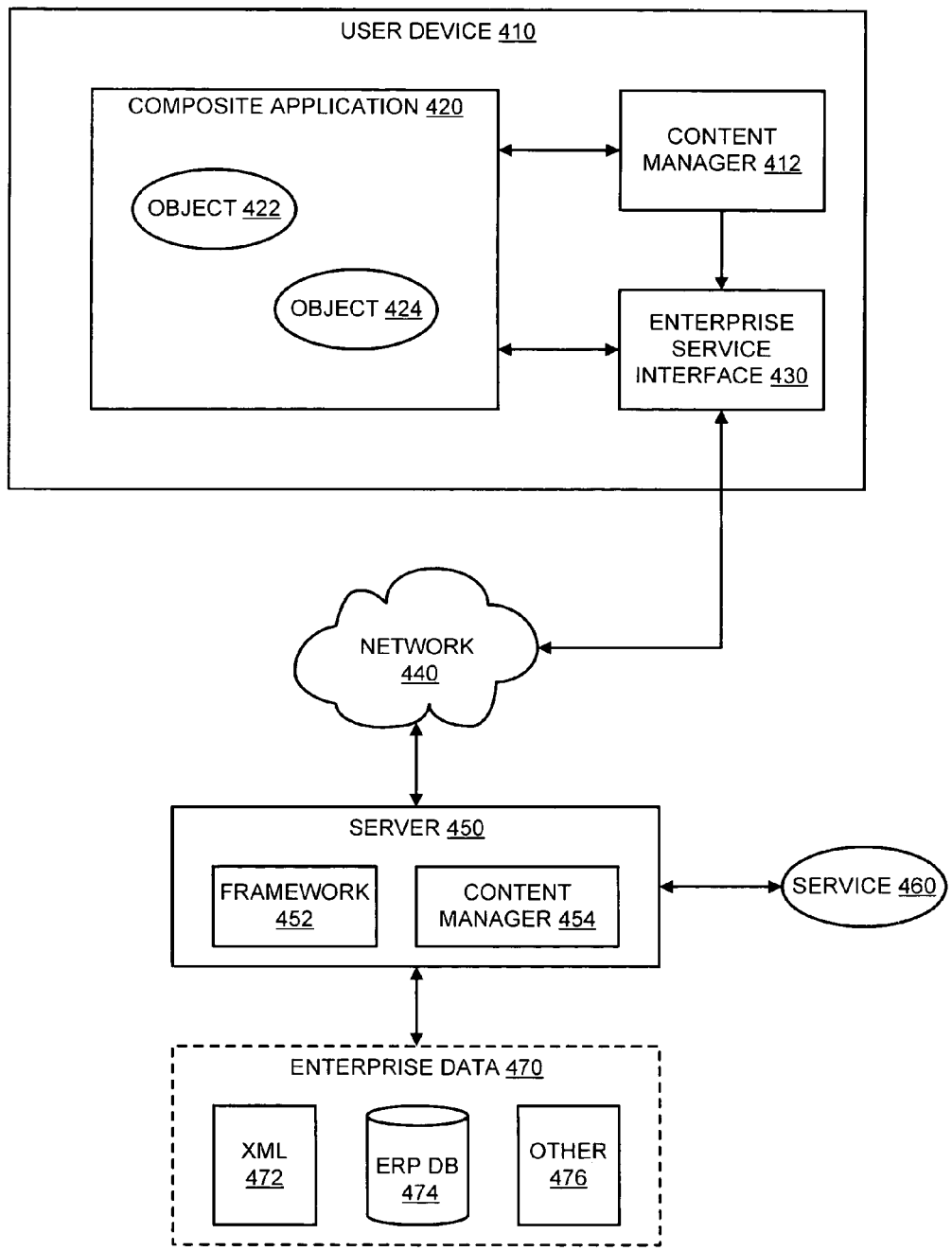
FIG. 4 is a block diagram of an embodiment of a user device with an application content manager.

FIG. 4 is a block diagram of an embodiment of a user device with an application content manager. User device 410 represents a computer device on which a user accesses an enterprise. User device 410 includes composite application 420, which represents modeled software that may be generated with relatedness information and/or account for relatedness information in execution. Composite application 420 can include any number of objects 422-424 and/or services that call objects 422-424.

In one embodiment, user device 410 includes content manager 412, which represents one or more modules that can provide object management functions. Content manager 412 as it exists on user device 410 may be simply one or more mechanisms (e.g., communication agents) that gather relatedness information based on the use of objects in composite application 420 and/or provide relatedness information to affect the viewable content of composite application 420. Composite application 420 can be contextual in the information it provides. For example, accessing object 422 within composite application 420 may trigger content manager 412 to provide object 424. In another example, based on the combination of objects 422-424 within composite application 420, content manager 412 may provide a guided procedure or process based on a heuristic determination of what composite application 420 may be trying to accomplish. Certain views may be limited, and others provided to make a user of composite application 420 more effective by contextual adaptation. Objects 422-424 may include metadata accessible to content manager 412, which may allow content manager 412 to determine context and provide suggestions. In one embodiment, content manager 412 stores metadata to objects 422-424 based on behavior of the objects content manager 412 observes.

Enterprise service interface 430 represents one or more components to provide access from user device 410 to a network and an underlying enterprise system. Enterprise service interface 430 may also include a portal through which to access network 440. Network 440 may include any type of network, and represents both hardware and software or network protocol(s) with which user device 410 accesses server 450. Network 440 may include a local area network (LAN), a wireless LAN (WLAN), a virtual private network (VPN), virtual LAN (VLAN), wide area network (including the Internet), etc.

Server 450 includes framework 452 to generate service directory as a composite application. Server 450 is an enterprise server and provides access to one or more services 460, which may be incorporated into composite application 420, and to one or more elements of enterprise data 470. Enterprise data 470 can include any type of data or information, and may include for example, extensible markup language (XML) data, enterprise resource planning database (ERP DB) 474, or other data 476.

In one embodiment, server 450 includes content manager 454, which may be a separate element of a content manager from content manager 412. In one embodiment, content managers 454 and 412 are cooperative elements for providing relatedness information to develop and use composite application 420. Thus, certain elements of a content manager may reside on a user device, or within a physical or virtual machine that constitutes user device 410, and other elements may reside on an enterprise server. In one embodiment, content manager 412 is a local agent or stub of content manager 454 to gather and provide relatedness information that is processed by content manager 454.

Figure 5:
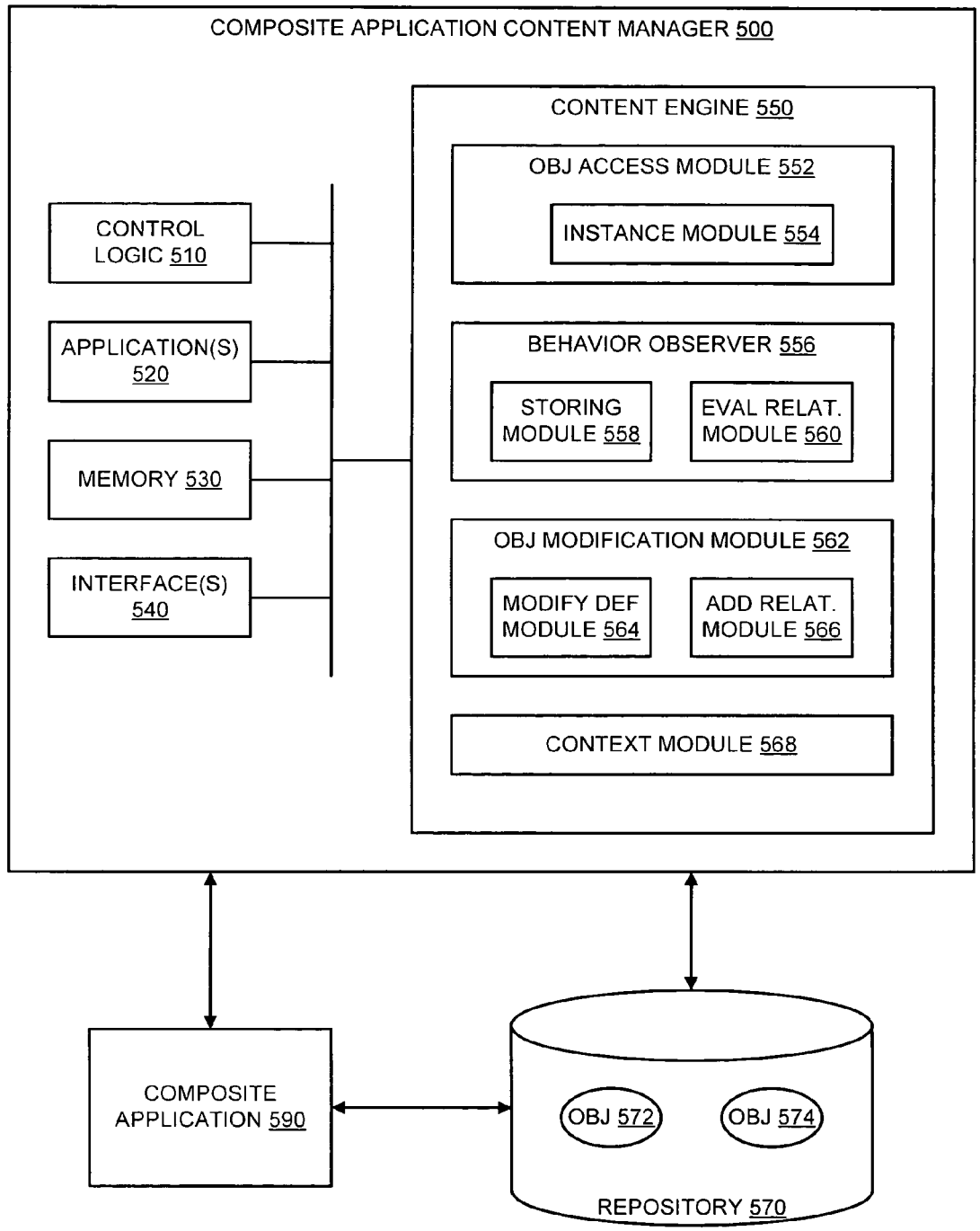
FIG. 5 is a block diagram of an embodiment of a composite application content manager.

FIG. 5 is a block diagram of an embodiment of a composite application content manager. Composite application content manager 500 includes control logic 510, which implements logical functional control to direct operation of composite application content manager 500, and/or hardware associated with directing operation of composite application content manager 500. Logic may be hardware logic circuits and/or software routines. In one embodiment, composite application content manager 500 includes one or more applications 520, which represent code sequence and/or programs that provide instructions to control logic 510. Composite application content manager 500 includes memory 530 and/or access to memory resource 530 for storing data and/or instructions. Memory 530 may include memory local to composite application content manager 500, as well as, or alternatively, including memory of the host system on which composite application content manager 500 resides. Composite application content manager 500 also includes one or more interfaces 540, which represent access interfaces to/from (an input/output interface) composite application content manager 500 with regard to entities (electronic or human) external to composite application content manager 500. Interfaces 540 include mechanisms through which composite application content manager 500 can be incorporated into a host application, and may further include interfaces from composite application content manager 500 to other components or applications of a system in which the host application executes.

Composite application content manager 500 also includes content engine 550, which represents one or more functions that enable composite application content manager 500 to provide relatedness information to affect the content of a composite application. The functions or features include, or are provided by, one or more of object access module 552, behavior observer 556, object modification module 562, and context module 568. Each of these modules may further include other modules to provide other functions. As used herein, a module refers to routine, a subsystem, etc., whether implemented in hardware, software, or some combination. The descriptions below refer to data objects, or simply objects, but should be understood as being applicable to any composite application building block.

Object access module 552 enables content engine 550 to access a data object from an enterprise data store. The data object may include metadata that object access module 552 accesses to determine relatedness information for the accessed object. Object access module 552 may include instance module 554 to enable content engine 550 to generate an instance of an object for use in a composite application. Object instances may be generated for each instance of a composite application that is executed. The object instances derive from the object stored in enterprise data and provide the ability to inherit content, including metadata and relatedness information. The relatedness information allows content engine 550 to provide dynamic contextual capacity to a composite application.

Behavior observer 556 enables content engine 550 to observe and record the behavior or use of a monitored data object. The behavior may include relationships with other components of a composite application (e.g., other objects). Certain relationships of the objects may be defined at instantiation of the data object. Behavior observations may help determine whether relationships should be added, removed, or otherwise changed to result in a more usable (and hence, re-usable) data object. Behavior observer 556 may include storing module 558, which enables content engine 550 to store observed behavior, for example, adjusting a definition of a data object. In one embodiment, behavior data for multiple data objects is stored in a single location that can be accessed and used to affect object use. In another embodiment, behavior data is stored locally with the data object. Behavior observer 556 may also include evaluate relationship module 560, which provides a mechanism to enable content engine 550 to compare and evaluate relationships of objects with other building block components of a composite application. Evaluate relationship module 560 may indicate a closeness of a relationship (e.g., one of several discrete levels, binary (i.e., closely related or not)).

Object modification module 562 enables content engine 550 to provide an object definition change, or define a new object based on the observed object. As used herein, modifying an object definition can be understood as including defining a new object that starts with the definition of the original object and is added to or otherwise altered in the new object. Object modification module 562 includes the ability to save an object definition to a repository of objects that is accessible to multiple applications. Object modification module 562 may include modify definition (def) module 564 to specifically alter the definition of an object. The definition of the object may include its relationships. Altering the definition of an object may include changing metadata associated with the object, because metadata can define the behavior and relationships of an object. Object modification module 562 may also include add relationship module 566, which enables content engine 550 to expand on the definition of an object by adding a relationship for the object. The definition may include, for example, that when the object is viewed, a particular other object should also be accessed.

Content engine 550 may also include context module 568 to enable content engine 550 to provide context during development or execution of an application. As discussed herein, a view of a composite application can be changed based on context provided for a particular business object or process that is accessed. Context module 568 can affect the content of a development window by prompting a user based on the context of a particular process being developed, or an object being used. The context may be affected based on heuristic determinations, as described below.

Composite application content manager 500 may access repository 570, which includes one or more objects 572-574, including their definitions. Note that repository 570 is not necessarily a single physical device. The more applications and systems that access repository 570, the more reuse of the objects is encouraged. Composite application content manager 500 can access composite application 590, and may affect the content of composite application 590, as discussed herein.

Composite application content manager 500 may include hardware, software, and/or a combination of these. In a case where composite application content manager 500 or its constituent components includes software, the software data, instructions, and/or configuration may be provided via an article of manufacture by a machine/electronic device/hardware. An article of manufacture may include a machine readable medium having content to provide instructions, data, etc. The content may result in an electronic device as described herein, performing various operations or executions described. A readable accessible medium includes any mechanism that provides (i.e., stores and/or transmits) information/content in a form accessible by a machine (e.g., computing device, electronic device, electronic system/subsystem, etc.). For example, a machine readable medium includes recordable/non-recordable media (e.g., read only memory (ROM), random access memory (RAM), magnetic disk storage media, optical storage media, flash memory devices, etc.). The machine readable medium may further include an electronic device having code loaded on a storage that may be executed when the electronic device is in operation. Thus, delivering an electronic device with such code may be understood as providing the article of manufacture with such content described herein. Furthermore, storing code on a database or other memory location and offering the code for download over a communication medium may be understood as providing the article of manufacture with such content described herein.

Figure 6:
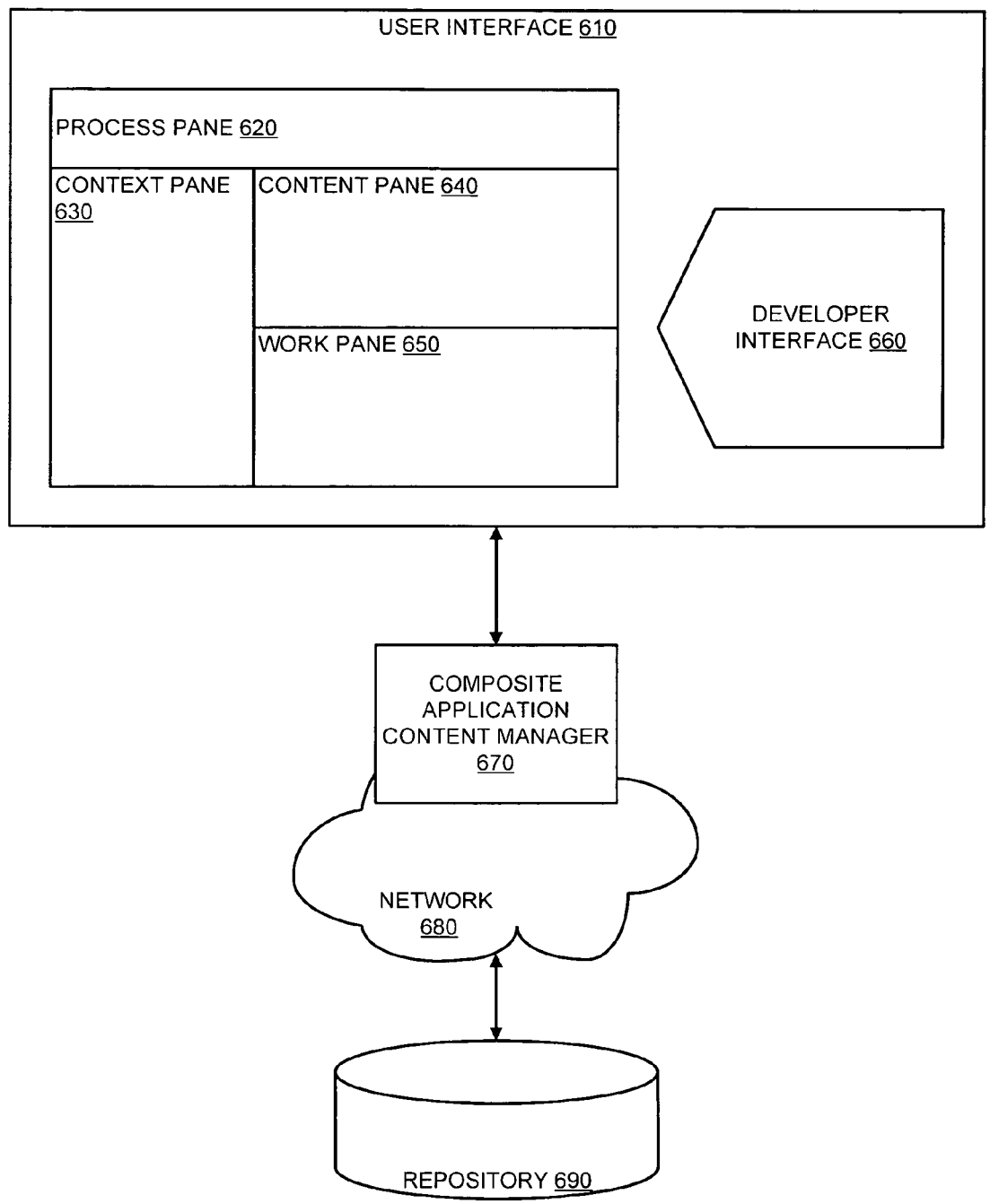
FIG. 6 is a block diagram of an embodiment of a user interface coupled to a content manager.

FIG. 6 is a block diagram of an embodiment of a user interface coupled to a content manager. In one embodiment, a work center, control center, or activity on a phase of a business process may be provided with a similar view on data. For example, user interface 610 includes process pane 620 across the top of a display window. Process pane 620 provides a visualization of the business process displayed in user interface 610. User interface 610 represents the hardware (e.g., a display device) and software (e.g., an operating system) in which a graphical user interface is provided. Process pane 620 indicates what phase of a process is being performed, and/or what phase is being displayed.

User interface 610 includes context pane 630, which provides an area for navigation menu items. The navigation menu items may include tabs, icons, and/or text to indicate a context that may be selected. The view of data provided may depend upon what is selected in context pane 630. In one embodiment, context pane 630 includes relatedness information. Context pane 630 is contextually dependent, and provides help, favorites, activity-specific information, etc., which changes depending on relatedness and context. A standard business process is provided, and the processes and objects that make up the business process can provide information that allows the items of context pane 630 to change dynamically.

Content pane 640 provides available content for the business process, according to the view provided in the context of the relatedness data. Work pane 650 allows for input from a user to access, use, modify, etc., a business object.

A programming environment may enable a similar, but not identical view on data. In one embodiment, similar panes are used, which provide an area in which to build an application. In addition to the particular panes shown, a development-oriented user interface can provide additional functionality to improve a user's ability to develop. Developer interface 660 provides a development-oriented environment. In one embodiment, developer interface 660 is part of a pop-up window. Developer interface 660 may include drag and drop mechanisms, and may have content dynamically change, depending on the relatedness of one object to another.

In one embodiment, developer interface 660 includes, or works in conjunction with, an interactive wizard, which refers to a guided procedure of requesting user input to perform each part of a development task. The wizard can indicate the relatedness determined by composite application content manager 670, which is an example of a content manager according to any embodiment described herein. For example, a wizard may query whether the work is a hiring process. If the answer provided is 'No,' the wizard may query whether the work is an acceptance pattern. In one embodiment, the wizard attempts to first match to a process, and then match to a pattern.

User interface 610 is coupled to content manager 670. As used herein, coupling refers to providing any form of connectivity, such as electrical, communicative, or physical. Content manager 670 may be part of network 680, or executed from a device on network 680. User interface 610 may have connections to network 680 other than through content manager 670.

Network 680 couples content manager 670 to repository 690, which may include objects and metadata, as described above. In one embodiment, content manager 670 executes a backend process to scour or search repository 690 for relatedness information. Content manager 670 may also, or alternatively, store relatedness information provided directly from a user. Thus, relatedness information can be determined directly or indirectly, and may include information stored within objects instantiated on the user device, objects or metadata stored in an enterprise storage, and/or stored within a content manager.

Figure 7:
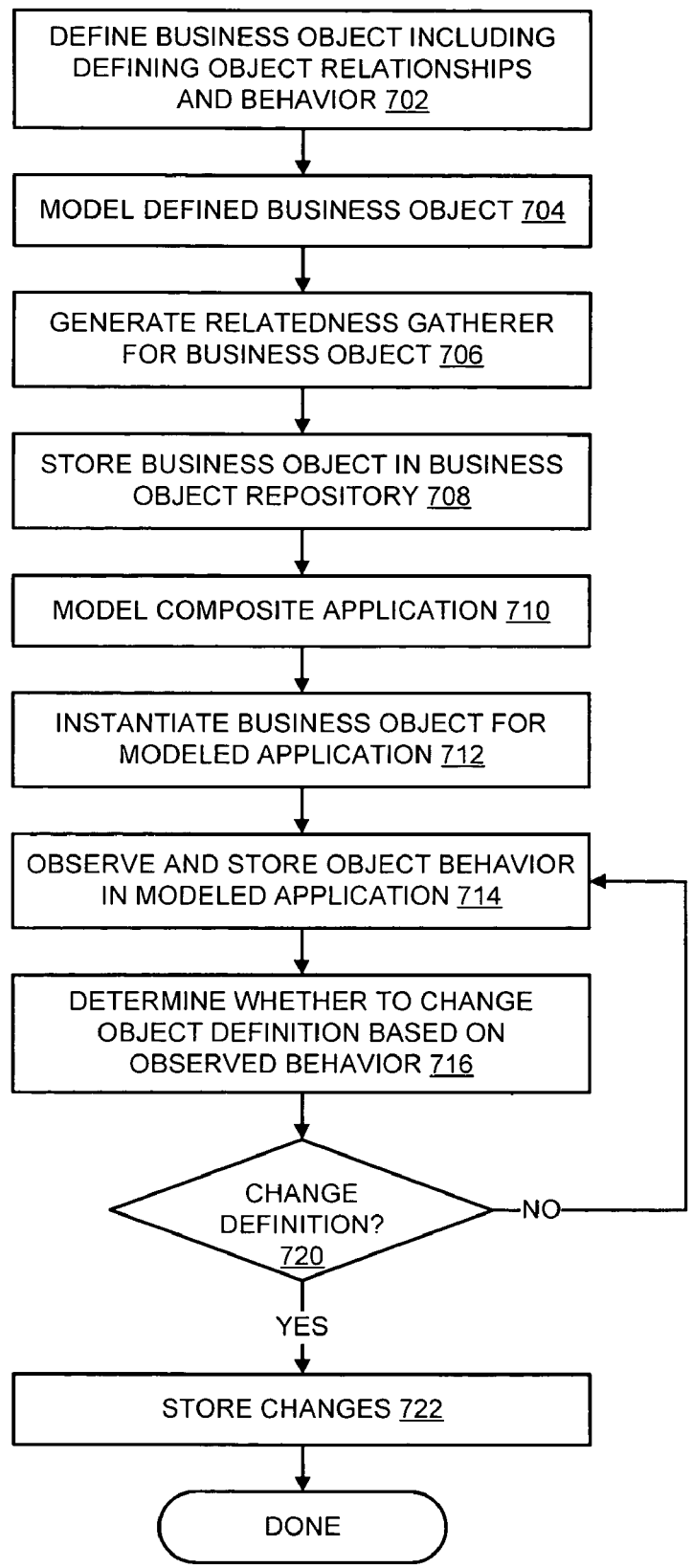
FIG. 7 is a flow diagram of an embodiment of modifying a business object.

FIG. 7 is a flow diagram of an embodiment of modifying a business object. A business object is defined, which may include defining a relationship of the object with other object, and defining behavior of the object, 702. The business object is modeled in the framework described herein, 704. Defining and modeling the business object results in an instance of the business object. Instances of the business object can then be generated to inherit the business object's properties and used in modeled software. The business object can be stored in a gallery of components that are used in generating modeled software. The defining and modeling within the framework are typically performed by a user.

A relatedness information gatherer is also generated for the business object, 706. The relatedness gatherer may include metadata that is associated with the business object. The relatedness gatherer may refer to the agent or content manager that will observe and store information regarding behavior of the object. The relatedness gatherer may be generated automatically within the framework when an object is defined, and/or when an object instance is created. Alternatively, the relatedness gatherer may be created by a user.

The business object is stored in business object repository, 708, for access and use by composite applications. A composite application can be modeled based on the business object, 710. An instance of the business object can be generated for the composite application when the composite application is executed, 712. The instantiation of the business object may trigger an information gatherer to begin gathering data and/or comparing use of the object against known patterns or processes. The information gatherer/content manager observes and stores the behavior of the object as observed in the modeled application, 714. Storing the behavior may be performed selectively, for example, by storing only new or modified relationships defined for the business object within the application. A particular enterprise may use business objects differently than another enterprise. The relatedness information allows the business object repository to evolve to match each particular enterprise and their use of business objects.

The observed behavior may be compared with previously observed behavior, or known behavior, to determine whether to change the object definition (either the core definition of the object and/or metadata of the object) based on the observed behavior, 716. The changing of the object definition may be defined with any set of heuristic algorithms, which may aggressively change (e.g., each time a different use is made), or more cautiously change (e.g., after a threshold number of times) an object definition. If the definition is not to be changed, 720, the content manager can continue to monitor whether another change is made that should be considered for changing the object definition. If the behavior definition is to be changed, 720, the changes are stored, 722, according to the implementation. The changes could be stored with the object, or in some other manner such as in a metadata repository.

Figure 8:
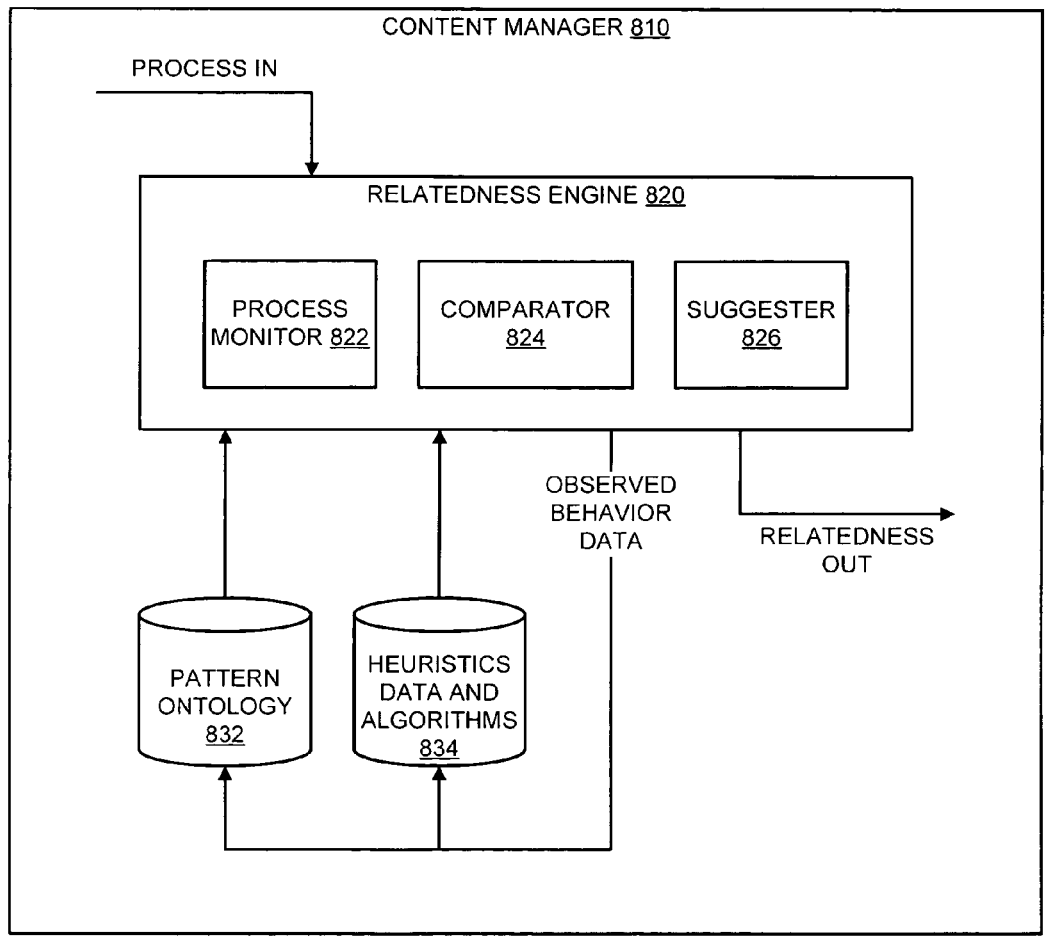
FIG. 8 is a block diagram of an embodiment of a content manager with a relatedness engine.

FIG. 8 is a block diagram of an embodiment of a content manager with a relatedness engine. Content manager 810 represents a content manager according to any embodiment described herein. Content manager 810 includes relatedness engine 820 to enable content manager 810 to perform operations associated with determining and acting upon relatedness information for objects used in modeled software. Relatedness engine 820 receives a process input and provides a relatedness output. The process in refers to receiving information regarding the status of a process or the performance of an action within a process. The relatedness out refers to a result or an evaluation of the process in light of known information.

Relatedness engine 820 includes process monitor 822, which enables relatedness engine 820 to observe the behavior of the evaluated process. Receiving input based on action with a process or object may refer to active monitoring of the behavior. Relatedness engine 820 further includes comparator 824, which enables relatedness engine 820 to monitor the process and make any of a number determinations based on the observed behavior. For example, comparator 824 may determine whether an object is selected or operated on that has metadata describing a relationship to another object and defining an action for the relationship, determine whether an action or a sequence of actions matches a know sequence, determine whether a process being defined is similar to a process that is known, etc. If comparator 824 detects a match on any of a number of operations it may be performing, relatedness engine 820 may determine through suggester 826 what is an appropriate action to perform. For example, metadata may define a particular action for particular relationships or conditions.

Relatedness engine 820 may provide the observed behavior data to one or more databases of information, for example for storing. In one embodiment, content manager 810 includes, or has access to (e.g., has interfaces or other calling mechanisms to obtain information) from pattern ontology 832 and heuristics data and algorithms 834. Pattern ontology 832 refers to a store of information that classifies certain process patterns. The ability to classify and map all possible business processes is work being performed by academics, and is beyond the scope of this document. Pattern ontology 832 can be understood as referring to a useful set or subset of process classifications that may be applicable to a particular enterprise, including past processes used by the enterprise and/or public processes related to private (proprietary) processes known to the enterprise.

Heuristics data and algorithms 834 refer to information and statistical engines that can make comparisons and determinations of how related test data is compared to known data. The heuristic algorithms and data can be provided to comparator 824, for example, for execution. The heuristics data can be updated with each process in for which data is observed. The heuristic algorithms may also be affected based on the observed data (e.g., by increasing the test set, which may trigger a change to an algorithm to account for the increase).

Figure 9:
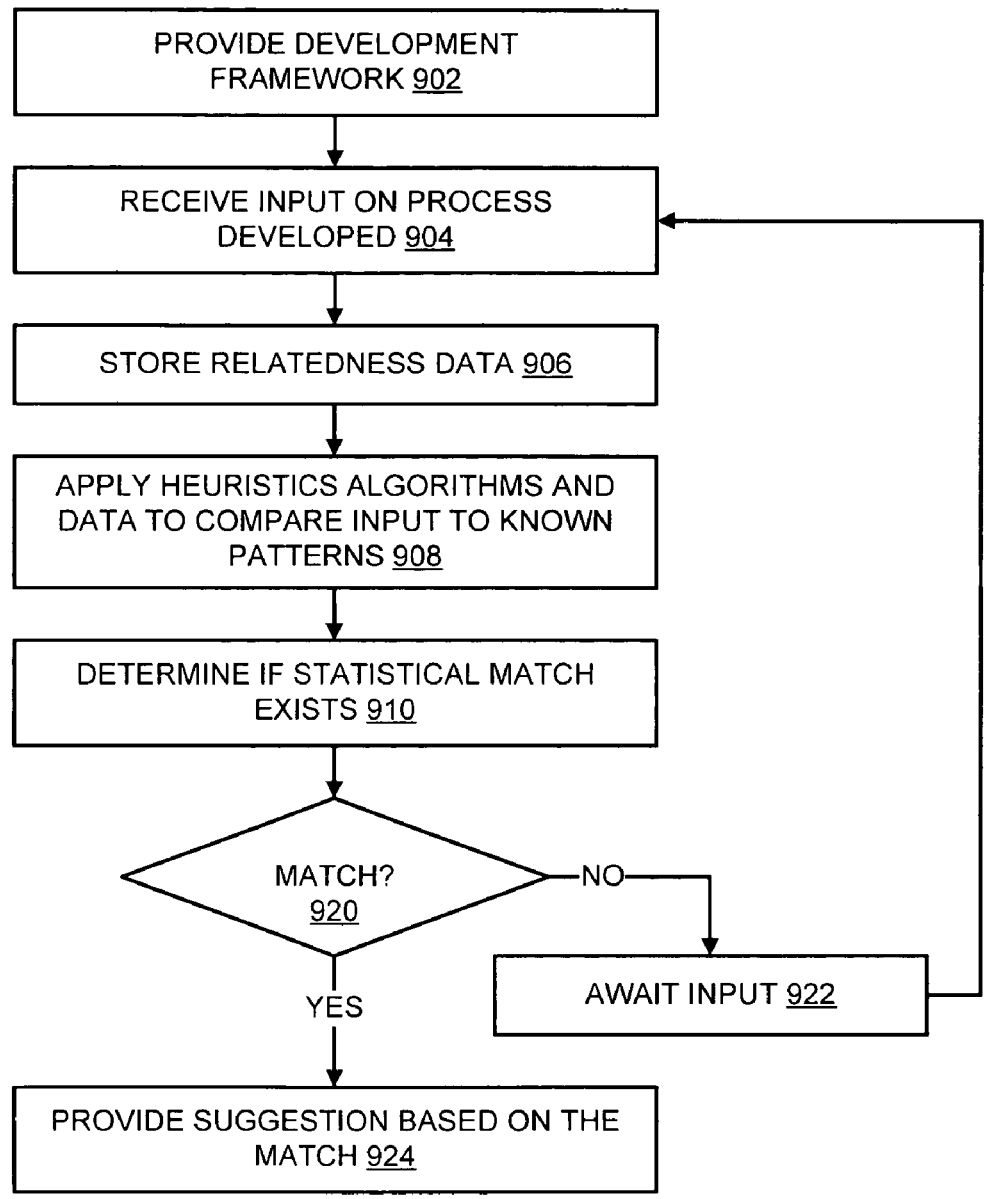
FIG. 9 is a flow diagram of an embodiment of determining relatedness.

FIG. 9 is a flow diagram of an embodiment of determining relatedness. A system for generating and implementing business process software provides a development framework, 902. The development framework allows the generation of composite applications and provides an example of any embodiment of a framework as described herein. The development framework may include the use of a content manager to provide contextual information to an application based on relatedness data. The content manager receives input on a process developed with the framework, 904. The input could be a use of a business object, which is evaluated with a relatedness determination mechanism.

Relatedness data may optionally be stored, 906. The data may be stored always, or may be selectively stored, such as when a new relationship is used. The relatedness determination mechanism applies heuristics algorithms to compare the input data to know patterns or processes, 908. The relatedness determination mechanism can then determine if there is a statistical match between the input data and the known process or pattern, 910. A statistical match may refer to an output statistic of a heuristic algorithm. For example, a result of a particular threshold number or higher may indicate a sufficient relationship to provide a context shift in a view or operation of a composite application. In one embodiment, potential matches can be ordered based on the amount of match that exists. The ordered potential matches can be tried one at a time, in sequence, prompting a user for input. The number presented can be limited to a certain number of attempts and/or to a certain result value (e.g., over a particular percentage of likelihood of match).

If there is no statistical match, 920, the relatedness determination mechanism awaits more input, 922. If there is a match, 920, the relatedness determination mechanism may indicate the match to a content manager that can provide a suggestion of context based on the match, 924. For example, another object can be accessed, a view can be changed, a pop-up suggestion can be presented to a user, etc.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method comprising:
    modeling a building block component, the building block component having a behavior definition;
    creating an information gatherer for the building block component to gather relatedness information of the building block component to components of a composite application modeled with the building block component,
    the relatedness based, at least in part, on an observed runtime behavior of the building block component in the composite application, where the observed runtime behavior is compared with previously observed behavior of the building block component to determine relatedness to the components;
    storing the building block component in a repository of building block components with which to generate the composite application, including storing the relatedness information;
    modeling the composite application with the building block component from the repository; and
    modifying the behavior definition of the building block component in accordance with the observed behavior of the relatedness information of the building block component.

2. The method of claim 1, wherein modeling the building block component comprises:
    modeling one or more of a business object, a service that accesses a business object, a business process, or a template.

3. The method of claim 1, wherein the composite application comprises a software program.

4. The method of claim 1, wherein the composite application comprises a business process.

5. The method of claim 1, wherein storing the relatedness information comprises:
    storing metadata with the building block component.

6. The method of claim 1, wherein modifying the behavior definition of the building block component comprises:
    modifying metadata that indicates a relationship between the building block component and another building block component.

7. A composite application content manager executing in a computing device comprising:
    a memory coupled with a control logic which, when executed by the computing device, causes the computing device to,
    generate an object access module to provide access to a data object repository, the data object repository including a data object having a behavior definition, including a description of a relationship with one or more other components of a composite application that accesses the data object;
    generate an object behavior observer coupled to the object access module to gather information based on observed runtime behavior of the data object in the composite application; and
    generate an object modification module coupled to the object behavior observer to modify the behavior definition of the data object based, at least in part, on the gathered information, including modifying based on relatedness determined by comparing the observed runtime behavior with a previously observed behavior of the data object.

8. The composite application content manager of claim 7, wherein the object behavior observer further comprises:
    a relationship evaluation module to determine if the gathered information matches previously known behavior of the data object.

9. The composite application content manager of claim 8, wherein the object modification module further comprises:
    a new relationship module to add to the data object behavior definition a relationship between the data object and one or more of the other components determined to be not previously known.

10. The composite application content manager of claim 7, wherein the object modification module further comprises:
    a new relationship module to generate a new composite data object that includes the data object and one or more of the other components determined to have a relationship with the data object.

11. A composite application programming system comprising:
    a framework that provides access to services of multiple, disparate backend enterprise systems;
    a repository to store a business object having a behavior definition; and
    a composite application content manager coupled to the framework and the repository having:
        an object access module to access the business object as a component of a composite application;
        an object behavior observer to gather relatedness information based on observed runtime behavior of the business object that indicates how the business object is used with other components of the composite application; and
        a context module to modify accessible content of the composite application based at least in part on the gathered relatedness information, including modifying the behavior definition of the business object based on relatedness information determined by comparing the observed runtime behavior with a previously observed behavior of the business object.

12. The composite application programming system of claim 11, wherein the context module modifies the accessible content based on a result of a heuristic determination produced with the gathered relatedness information.

13. The composite application programming system of claim 11, wherein the composite application content manager further comprises:
an object definition modifier module to modify metadata defining at least a portion of the behavior definition of the business object.

14. A method in a computing device comprising:
providing, via the computing device, a data object as a building block for modeled software, the data object having a definition of a behavior of the data object, including a description of a relationship with one or more other data objects;
observing, via the computing device, a runtime behavior of the data object in a modeled software application that accesses the data object;
comparing, via the computing device, the runtime behavior of the data object with a previously observed behavior of the data object; and
modifying, via the computing device, the definition of the behavior of the data object to provide an updated building block for modeled software in response to comparing the runtime behavior of the data object.

15. The method of claim 14, wherein providing the data object having the definition comprises:
providing the data object having a description of a relationship with one or more other data objects.

16. The method of claim 14, wherein observing the behavior of the data object comprises:
searching an enterprise database to identify a relationship between the data object and another data object.

17. The method of claim 14, wherein observing the behavior of the data object comprises:
receiving user input that identifies a relationship between the data object and another data object.

18. The method of claim 14, further comprising:
providing a developer interface window to develop the modeled software with the data object;
wherein observing the behavior of the data object comprises:
determining a use of the data object in the modeled software being developed.

19. The method of claim 18, further comprising:
providing a suggestion of a use of the data object in response to observing the behavior of the data object in the developer interface.

20. The method of claim 19, wherein providing the suggestion comprises:
providing a guided procedure to suggest a pattern of use in the modeled software based on a known use of the data object.

21. An article of manufacture comprising a machine readable storage medium having content stored thereon to provide instructions to cause a machine to perform operations, including:
providing a data object as a building block for modeled software, the data object having a definition of a behavior of the data object, including a description of a relationship with one or more other data objects;
observing a runtime behavior of the data object in a modeled software application that accesses the data object;
comparing the runtime behavior of the data object with a previously observed behavior of the data object; and
modifying the definition of the behavior of the data object to provide an updated building block for modeled software in response to comparing the runtime behavior of the data object.

22. The article of manufacture of claim 21, wherein observing the behavior of the data object comprises:
generating a heuristic evaluation of a use of the data object compared to a known use of the data object.

23. The article of manufacture of claim 21, wherein modifying the definition of the data object comprises:
alternating a metadata definition of a behavior of the data object.

* * * * *